US011924501B1

(12) United States Patent
Curry et al.

(10) Patent No.: US 11,924,501 B1
(45) Date of Patent: Mar. 5, 2024

(54) SYSTEM AND METHOD FOR DYNAMIC PRESENTATION OF GRAPHICAL AND VIDEO CONTENT

(71) Applicant: WARNERMEDIA DIRECT, LLC, New York, NY (US)

(72) Inventors: John Curry, New York, NY (US); Madeline Courtney, New York, NY (US); Justina Villanueva, New York, NY (US); Michael Martin, New York, NY (US); Dinar Bulatov, New York, NY (US); Joshua Toczko, New York, NY (US); Daniel Friedwald, New York, NY (US)

(73) Assignee: WARNERMEDIA DIRECT, LLC., New York, NY (US)

( * ) Notice: Subject to any disclaimer, the term of this patent is extended or adjusted under 35 U.S.C. 154(b) by 0 days.

(21) Appl. No.: 17/986,298

(22) Filed: Nov. 14, 2022

(51) Int. Cl.
| | |
|---|---|
| *H04N 21/431* | (2011.01) |
| *H04N 21/472* | (2011.01) |
| *H04N 21/482* | (2011.01) |
| *H04N 21/485* | (2011.01) |

(52) U.S. Cl.
CPC ... *H04N 21/4312* (2013.01); *H04N 21/47217* (2013.01); *H04N 21/4825* (2013.01); *H04N 21/4858* (2013.01)

(58) Field of Classification Search
CPC ......... H04N 21/4312; H04N 21/47217; H04N 21/4825; H04N 21/4858
See application file for complete search history.

(56) References Cited

U.S. PATENT DOCUMENTS

| | | | |
|---|---|---|---|
| 10,567,829 B2* | 2/2020 | Kleinerman ..... | H04N 21/26283 |
| 2008/0046932 A1* | 2/2008 | Stallings ............ | H04N 21/4821 |
| | | | 725/39 |
| 2016/0112752 A1* | 4/2016 | Selvaraj ............. | H04N 21/8153 |
| | | | 725/44 |

\* cited by examiner

*Primary Examiner* — Kunal Langhnoja
(74) *Attorney, Agent, or Firm* — Bookoff McAndrews, LLP

(57) ABSTRACT

Computing platforms and methods for dynamic presentation of graphical and video content are disclosed. Exemplary implementations may: provide, in a static browsing state, a static image associated with underlying video content; in response to an extended focus on the static image for a first threshold amount of time, expand a visual tile to a widescreen aspect ratio while remaining in the static browsing state; after a second threshold amount of time, initiate a dwell browsing state in which dwell tile content is provided in the expanded visual tile, while other content remains in the static browsing state; in response to a determination that the playback device supports a dwell video mode, play a video asset within the expanded visual tile; and in response to a determination that the playback device does not support the dwell video mode, provide an alternate non-video visual asset within the expanded visual tile.

20 Claims, 4 Drawing Sheets

SYSTEM AND METHOD FOR DYNAMIC PRESENTATION OF GRAPHICAL AND VIDEO CONTENT

FIELD

The present disclosure relates to content presentation, including but not limited to computing platforms, methods, and storage media for dynamic presentation of graphical and video content.

BACKGROUND

The presentation and consumption of video content is increasingly moving to asynchronous or on-demand presentation. This is in contrast to the traditional synchronous presentation associated with broadcast television, or an in-person movie theater experience.

A video content browser, or content browsing interface, enables a user to navigate a library of available video content on a particular device. Such a browser is often provided in the context of a dedicated application, or app, for video content. A video content app, or interface within the app, may provide different browsing features, for example depending on the device on which the app is running.

Video content browsers enable a user to access additional information related to a piece of content, for example when the user actively selects or clicks on a small tile or other element associated with the content. In some cases, the video content browser may auto-play an associated video in a "hero" area, or prominent portion of the browser, typically at the top. However, such auto-playing can be distracting and undesirable to a user who is simply browsing.

Improvements in approaches for dynamic presentation of graphical and video content are desirable.

BRIEF DESCRIPTION OF THE DRAWINGS

Embodiments of the present disclosure will now be described, by way of example only, with reference to the attached Figures.

DETAILED DESCRIPTION

Figure 1:
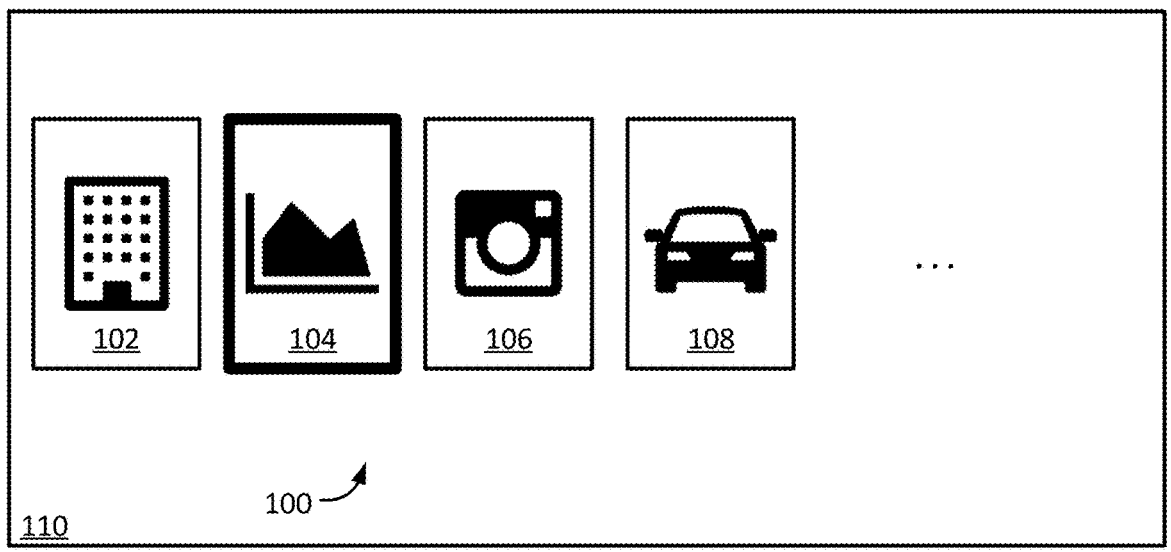
FIG. 1 illustrates three exemplary display states associated with a system and method for dynamic presentation of graphical and video content, in accordance with one or more embodiments.
Figure 1:
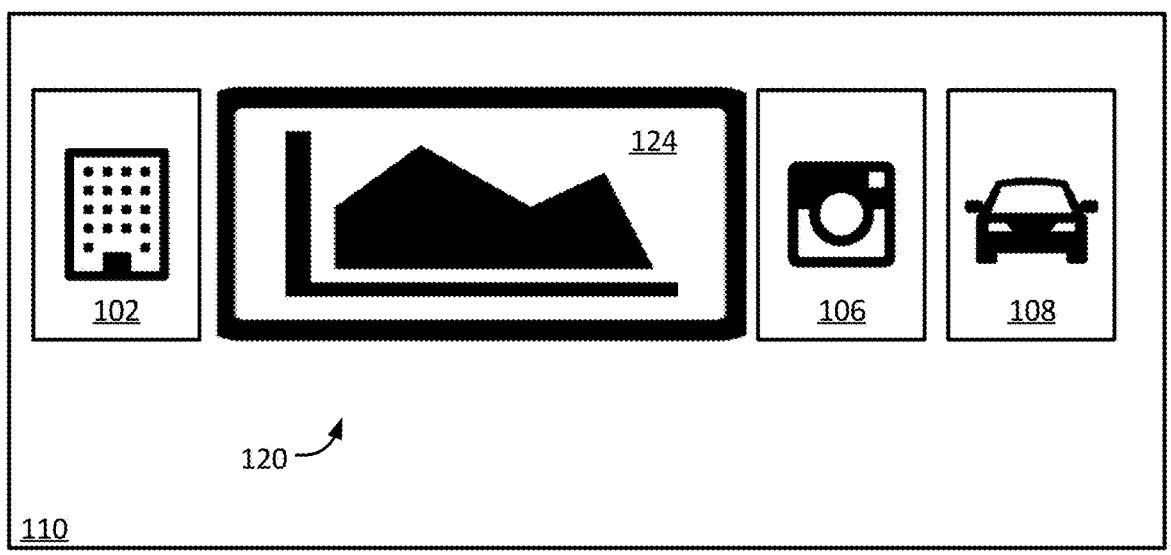
Figure 1:
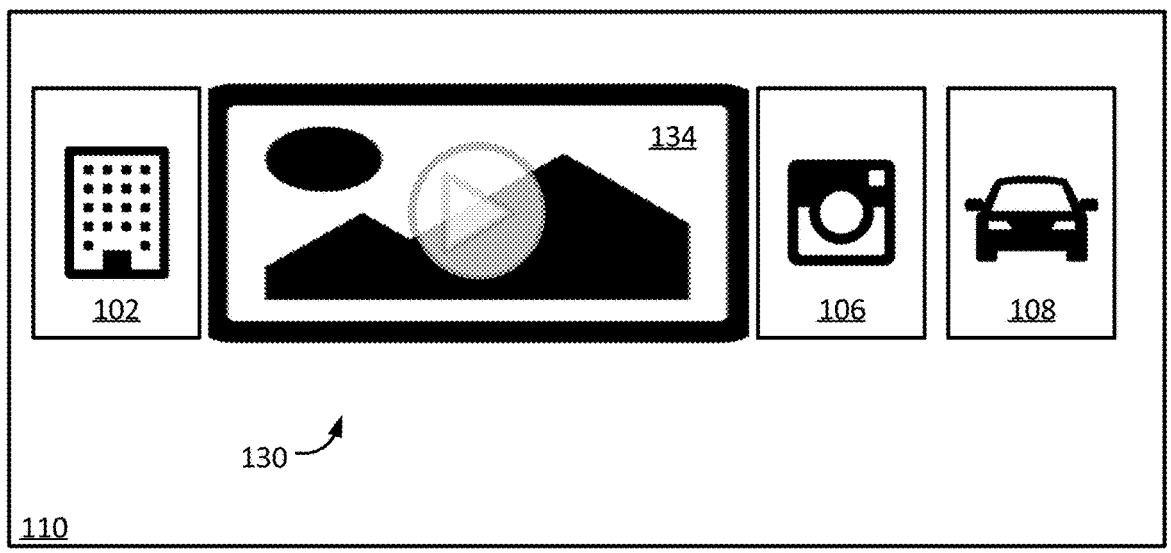

Computing platforms, methods, and storage media for dynamic presentation of graphical and video content are disclosed. Exemplary implementations may: provide, at a display associated with a playback device and in a static browsing state, a static image associated with underlying video content; in response to an extended focus on the static image for a first threshold amount of time, expand the visual tile to a widescreen aspect ratio while remaining in the static browsing state; after a second threshold amount of time, initiate a dwell browsing state for the expanded visual tile in which dwell tile content is provided in the expanded visual tile, while other content on the display remains in the static browsing state; in response to a determination that the playback device supports a dwell video mode, play a video asset within the expanded visual tile; and in response to a determination that the playback device does not support the dwell video mode, provide an alternate non-video visual asset within the expanded visual tile.

The present disclosure provides dynamic presentation of graphical and video content, for example within an app associated with a video streaming service. Embodiments of the present disclosure provide a differentiated browsing experience with a focus on variety and editorialized content strategy. Dwell tile functionality according to embodiments of the present disclosure provide additional and enhanced ways for users to explore and discover content.

In an example implementation, dwell tiles may showcase in-line short video previews. After user focus lingers on a title for a given amount of time, playback occurs. If a user clicks into a tile during playback, the in-line short preview may continue to play as the tile expands to fill the screen, acting as a video motion background for an asset detail page.

Embodiments of the present disclosure empower users to quickly and easily discover and sample new content, without leaving a browsing state, and without unduly obscuring other elements of the browsing experience. Embodiments of the present disclosure provide relevant and timely information up front, which reduces friction for users and creates confidence with each click or selection.

One aspect of the present disclosure relates to a computing platform configured for dynamic presentation of graphical and video content. The computing platform may include a non-transient computer-readable storage medium having executable instructions embodied thereon. The computing platform may include one or more hardware processors configured to execute the instructions. The processor(s) may execute the instructions to provide, at a display associated with a playback device and in a static browsing state, a static image associated with underlying video content. The static image may be provided within an active visual tile, such as vertical visual tile. The processor(s) may execute the instructions to, in response to an extended focus on the static image for a first threshold amount of time, expand the visual tile to a widescreen aspect ratio while remaining in the static browsing state. The processor(s) may execute the instructions to, after a second threshold amount of time, initiate a dwell browsing state for the expanded visual tile in which dwell tile content is provided in the expanded visual tile, while other content on the display remains in the static browsing state. The processor(s) may execute the instructions to, in response to a determination that the playback device supports a dwell video mode, play a video asset within the expanded visual tile. The video asset associated with the may underlie video content. The processor(s) may execute the instructions to, in response to a determination that the playback device does not support the dwell video mode, provide an alternate non-video visual asset within the expanded visual tile.

Another aspect of the present disclosure relates to a method for dynamic presentation of graphical and video content. The method may include providing, at a display associated with a playback device and in a static browsing state, a static image associated with underlying video content. The static image may be provided within an active visual tile, such as vertical visual tile. The method may include, in response to an extended focus on the static image for a first threshold amount of time, expanding the visual tile to a widescreen aspect ratio while remaining in the static browsing state. The method may include, after a second threshold amount of time, initiating a dwell browsing state for the expanded visual tile in which dwell tile content is provided in the expanded visual tile, while other content on the display remains in the static browsing state. The method may include, in response to a determination that the playback device supports a dwell video mode, playing a video asset within the expanded visual tile. The video asset associated with the may underlie video content. The method may include, in response to a determination that the playback device does not support the dwell video mode, providing an alternate non-video visual asset within the expanded visual tile.

Yet another aspect of the present disclosure relates to a non-transient computer-readable storage medium having instructions embodied thereon, the instructions being executable by one or more processors to perform a method for dynamic presentation of graphical and video content. The method may include providing, at a display associated with a playback device and in a static browsing state, a static image associated with underlying video content. The static image may be provided within an active visual tile, such as vertical visual tile. The method may include, in response to an extended focus on the static image for a first threshold amount of time, expanding the visual tile to a widescreen aspect ratio while remaining in the static browsing state. The method may include, after a second threshold amount of time, initiating a dwell browsing state for the expanded visual tile in which dwell tile content is provided in the expanded visual tile, while other content on the display remains in the static browsing state. The method may include, in response to a determination that the playback device supports a dwell video mode, playing a video asset within the expanded visual tile. The video asset associated with the may underlie video content. The method may include, in response to a determination that the playback device does not support the dwell video mode, providing an alternate non-video visual asset within the expanded visual tile.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates three exemplary display states associated with a system and method for dynamic presentation of graphical and video content, in accordance with one or more embodiments. In a first state 100, which may be described as a static browsing state, the system and method provide, at a display 110 associated with a playback device, a static image associated with underlying video content. In the example embodiment of FIG. 1, the static image is provided within an active visual tile, such as vertical visual tile. In other embodiments, the tile may have a different aspect ratio, for example a widescreen or 16×9 tile.

As shown in FIG. 1, in the first state 100, the display includes a plurality of vertical visual tiles 102, 104, 106 and 108, of which vertical visual tile 104 may be defined as an active tile. The active tile 104 is represented by a visual differentiator with respect to the other tiles, such as the thicker tile outline shown in FIG. 1. The vertical visual tile 104 may become the active tile based on a browsing navigation action that results in selection of the vertical visual tile 104. The browsing navigation action may comprise hovering over the vertical visual tile 104. The browsing navigation action may comprise moving a cursor or other indicator such that an active tile selection indicator is associated with the vertical visual tile 104.

In response to an extended focus on the static image 104 for a first threshold amount of time, the system may proceed to a second state 120. The extended focus may comprise an extended period of focus, for example a time period during which the browsing navigation action, or lack thereof, causes the vertical visual tile 104 to remain the active tile, without moving the browsing focus away from the vertical visual tile 104. The system may proceed to the second state after the period of extended focus exceeds the first threshold amount of time. In an alternative embodiment, the system may delay expansion of the visual tile for displaying dwell tile content beyond the first threshold amount of time based on detection of a display-limiting factor, such as a slow internet connection.

In the second state 120, the system may expand or transform the visual tile 104 from the first state 100 to a wider tile, which may be referred to as an expanded visual tile 124, with a widescreen aspect ratio, while remaining in the static browsing state. In an example embodiment, in the second state 120, the static image that was included in vertical visual tile 104 is expanded to fill the widescreen aspect ratio of the wider tile 124, while remaining a static image. In an example embodiment, the vertical visual tile has an aspect ratio of 2×3 and the widescreen aspect ratio is 16×9.

In the second state 120, the expanded visual tile 124 remains in the static browsing state, and the vertical visual tiles 102, 106 and 108 also remain in the static browsing state. In an example embodiment, the expanded visual tile 124 displays or includes a static image, so that the expanded visual tile 124, even though it is expanded and may optionally include additional details, remains in the static browsing state. This is in contrast to known approaches in which a video auto-plays after an extended period of focus, which can be distracting and undesirable if a user is simply trying to browse the content. The behaviour of known approaches often causes a user to navigate away from an active tile, in an effort to avoid auto-playing the video content, which disturbs the browsing experience and may even cause the user to simply navigate away from the content that they wanted to consider exploring further. According to one or more embodiments, a static image is displayed in the expanded visual tile after the extended period of focus, intentionally avoiding auto-playing of any video content after the extended period of focus exceeds the first threshold amount of time.

Embodiments of the present disclosure may expand an active tile after a period of extended focus, while remaining in a static browsing state, and subsequently initiate a dwell browsing state after a second threshold amount of time. Based on whether the playback device supports a dwell video mode, the system either provides a video asset within the expanded tile, or provides an alternate non-video visual asset. The system enables the dwell browsing state for the active tile, or expanded tile, while the rest of the interface remains in a static browsing state, preferably avoiding obscuring any adjacent content. This provides an improvement in the functionality of processors involved in the presentation of the graphical and video content, for example in a streaming video browser or app.

The data provided to the display is modified based on the static browsing state or the dwell browsing state, such that the associated steps result in a tangible and discernible effect or change in the in the display, or in the data stored in the memory associated with the processor generating and displaying or outputting the interface or the content. Embodiments of the present disclosure may also produce a discernible effect or change on both the stored data in the memory, and the data output for display. These improvements help to reduce the processing cost associated with display of video content, and advantageously provide dwell tile content in an adaptive manner based on determined playback device capabilities. This enables the system to provide a single process flow for providing either enhanced or reduced functionality in a dwell browsing state, which also reduces processing cost and complexity, which may provide benefits in processor and/or memory savings.

Embodiments of the present disclosure solve a problem in known approaches of auto-playing videos after a period of extended focus on an active tile. While some known approaches permit a user to turn off auto-playing videos, such an arrangement results in either an absence of enhanced video content upon extended focus, or bothersome auto-playing, which interrupts the browsing state. Embodiments of the present disclosure solve this problem by providing an improved system and method for dynamic presentation of graphical and video content, where a period of extended focus results in a discernible effect or change in the display that keeps an active tile in a static browsing state while providing different static content within the active tile. This advantageously provides a new state in which a user to explore the active tile further, without making the user navigate away from the tile to avoid auto-playing. Embodiments of the present disclosure also provide an improved system and method for dynamic presentation of graphical and video content, where after a period of extended focus and after a second threshold amount of time, the system selectively provides a video asset or an alternate non-video visual asset in a dwell browsing mode. This provides improved browsing functionality based on playback device capabilities, making use of available capabilities while providing a single method of dynamic presentation, regardless of the device type. This provides improvements in the presentation of video browsing content, compared to known approaches where different content flows may be required for different playback devices, for example a smart TV, a set-top box, a gaming console, a tablet or smartphone, or other mobile device or computing device that may be configured to display streaming video.

According to one or more embodiments, after a second threshold amount of time, which may be subsequent to the first threshold amount of time, the system may initiate a third state 130, which may be referred to as a dwell browsing state, for the expanded visual tile. In the dwell browsing state, dwell tile content is provided in the expanded visual tile 134, instead of the static image that was in the expanded visual tile 124 in the second state 120. In an embodiment, the initiation of the dwell browsing state is in response to extended focus on the active tile for the first threshold amount of time, and after expiry of the second threshold amount of time. Initiating the dwell browsing state in response to satisfaction of both of these conditions is in contrast to the undesirable known behaviour of auto-play-thing only after a period of extended focus.

The visual tile 124 may be expanded to display the resized static image, and to shift adjacent tiles such that the shifted adjacent tiles are unobscured by the expanded visual tile, as shown in state 120. This is in contrast to known approaches, in which adjacent content is often obscured when additional content is displayed or a video is auto-played, resulting in an interruption of the browsing experience at the expense of the additional content. Embodiments of the present disclosure advantageously provide different or expanded static browsing content for an active tile while maintaining an uninterrupted browsing state, or browsing experience, with respect to the adjacent content.

In the third state 130, the expanded visual tile 134 is in a dwell browsing state, while other content on the display including the vertical visual tiles 102, 106 and 108, remains in the static browsing state. In an example implementation, the dwell tile content plays in a currently active tile while the other content on the display remains unchanged in the static browsing state. Selectively initiating the dwell browsing state for only an active tile, while the rest of the content remains in the static browsing state, is an advantage according to an embodiment of the present disclosure, which keeps a user in a browsing state other than the active tile. Accordingly, the system is configured to produce a tangible and discernible effect or change in the in the display, or in the data stored in the memory associated with the processor generating and displaying or outputting the interface or the content. Embodiments of the present disclosure may also produce a discernible effect or change on both the stored data in the memory, and the data output for display. These improvements help to reduce the processing cost associated with display of video content by advantageously providing dwell tile content in a portion of a display, while the rest of the display remains in a static browsing state.

In an embodiment, the system causes a majority of the interface to remain in the static browsing state, while the active tile undergoes a transformation after an extended period of focus, but still remains in a static browsing mode, then the active tile transitions to a dwell browsing state. In an embodiment, the system causes the active tile to transform from a first aspect ratio in a first static browsing state to a second aspect ratio in a second static browsing state, then from the second static browsing state to a dwell browsing state while retaining the aspect ratio from the second static browsing state. In an alternative embodiment, the vertical visual tile comprises a wider tile having an aspect ratio similar to the widescreen aspect ratio, and the video asset is provided in the dwell browsing state in the same aspect ratio as the wider tile.

Advantageously, the system may be configured to provide different dwell tile content based on system capabilities, or based on capabilities of the playback device associated with the display. This functionality is based on a determination by the system with respect to dwell content to be provided in the third state, which is the dwell browsing state. In response to a determination that the playback device supports a dwell video mode, which may be defined as supporting streaming video content within the expanded visual tile, the system is configured to play a video asset within the expanded visual tile 134, where the video asset is associated with the underlying video content.

In an example embodiment, the system configures the display 110 to transform the active tile 104 from a browsing state 100 having a first static image, to an expanded visual tile 124 in a second 120 state having a second static image, and to play a video asset in the expanded visual tile 134 in the dwell browsing state 130, in response to a determination that the playback device supports a dwell video mode, while the other content remains in the static browsing state. In an example implementation, in the dwell video mode, the playback device supports playing video content within the expanded visual tile, while presenting static images or other static content in the other visual tiles. The system may delay initiation of the dwell browsing state beyond the second threshold amount of time based on detection of a display-limiting factor, such as slow internet connection, or difficulty accessing the video asset. The system may delay playing of the video asset in the expanded tile in the dwell browsing state, for example until a later time after the second threshold amount of time has been completed. In some implementations, the first and second threshold amounts of time may be adjustable based on detected device capabilities or user-specific settings.

In response to a determination that the playback device does not support the dwell video mode, the system is configured to provide an alternate non-video visual asset within the expanded visual tile 134 in the dwell browsing state 130. In an embodiment, the alternate non-video visual asset is different from the static image in the second state 120. In an example embodiment, the alternate non-video visual asset may include or be based on the static image from the second state 120, and may additionally include metadata such as season or episode information, current episode details, cast details, etc. The determination of whether the playback device supports the dwell video mode may be based on one or more of: device capabilities, internet connection speed available at the device, and type of device.

The visual tile 134 may be expanded to display the dwell tile content, and to shift adjacent tiles such that the shifted adjacent tiles are unobscured by the expanded visual tile, as shown in state 130. This is in contrast to known approaches, in which adjacent content is often obscured when additional content is displayed or a video is auto-played, resulting in an interruption of the browsing experience at the expense of the additional content. Embodiments of the present disclosure advantageously provide additional dwell content for an active tile while maintaining an uninterrupted browsing state, or browsing experience, with respect to the adjacent content. In an example embodiment, the dwell tile content is displayed in non-overlapping manner with respect to adjacent visual tiles, and optionally with respect to all other content displayed in the static browsing state.

In another embodiment (not shown), the system may persistently display a visual identifier in a position that appears to be on top of the static image in the static browsing state, and in the same position on top of the dwell tile content in the dwell browsing state. In an example embodiment, the visual identifier may be provided in a layer that is visually on top of a content layer, such that the visual identifier is substantially unchanged when the underlying content is changed. For example, the visual identifier may be a name, text or a logo associated with a particular brand. The brand may be a network or content creation platform, a franchise with both long and short form content, a movie or TV series, or any other set or group of content to be profiled. For example, the text "HBO" or a corresponding logo may be persistently displayed in a layer on top of the static image in the static browsing state, and in the same location in the dwell browsing state. Such persistent display provides an improvement over known approaches which may only overlay text or a logo in a single state, and are not configured to persistently provide such a visual identifier while the active tile transitions from a static browsing state to a dwell browsing state. The persistent display of the visual content when in the static browsing state and the dwell browsing state provides an advantage of maintaining association of the brand with the content throughout the transition between states, and improves brand positioning and recall for users or consumers of the content.

In an example embodiment, the system may display metadata associated with the dwell tile content while playing dwell tile content. Such metadata may include, for example, one or more of show title, episode title, cast information, duration information, favorite or watch list information, or position in content playback. In an example embodiment, the system may fade the dwell tile content in or out before or after playing the dwell tile content, to provide a more seamless and less abrupt transition between the browsing state and the dwell content state.

Figure 2:
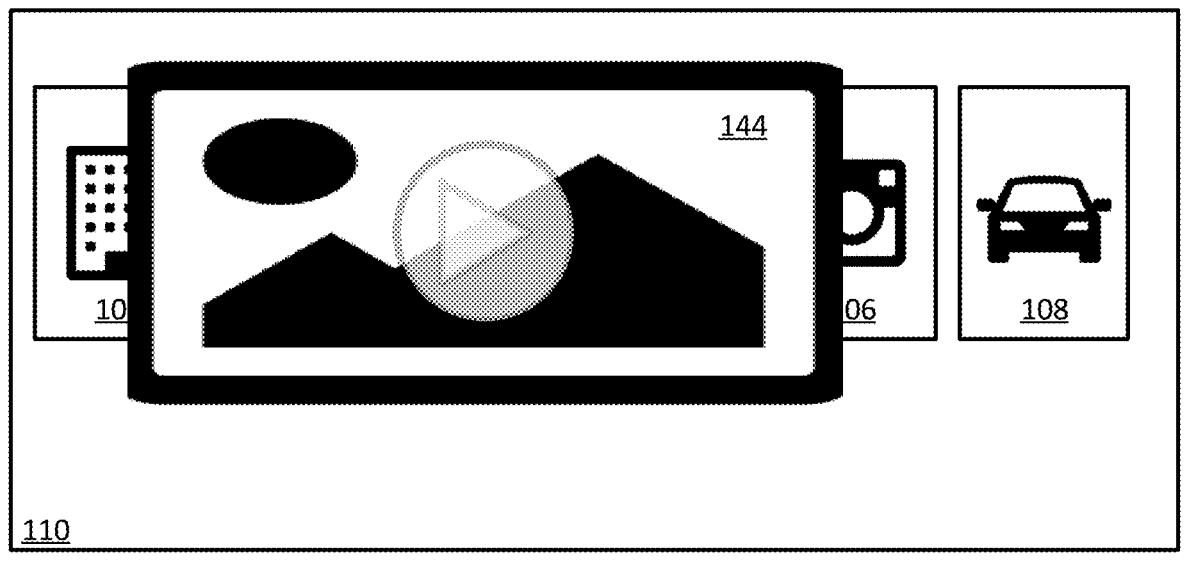
FIG. 2 illustrates two additional exemplary display states associated with a system and method for dynamic presentation of graphical and video content, in accordance with one or more embodiments.
Figure 2:
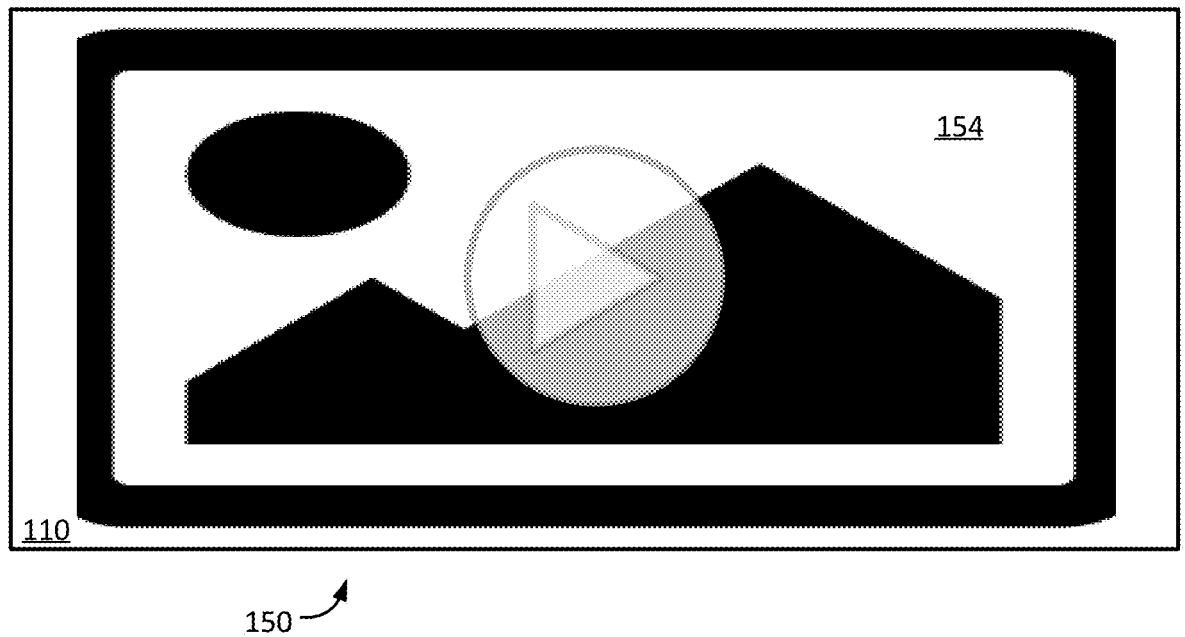

FIG. 2 illustrates two additional exemplary display states 140 and 150 associated with a system and method for dynamic presentation of graphical and video content, in accordance with one or more embodiments. State 140 follows an implementation in which, in dwell browsing state 130, the system plays a video asset within the expanded visual tile. In response to user selection of the playing video asset in the expanded visual tile, for example by clicking or otherwise actuating or selecting the playing video asset, the system is configured to launch or to begin launching as shown in state 140, a full-screen version of the video asset shown in state 150. In an embodiment, state 140 as shown in FIG. 2 may be an intermediate state between state 130 in FIG. 1 and the full-screen version of the video asset in state 150 in FIG. 2.

As shown in state 140 in FIG. 2, the launching starts from an active browsing position of the expanded visual tile. The active browsing position may be the position as shown in state 130 in FIG. 1. The state 140 may be a transitional state during the launching from the active browsing position, and before the full-screen version of the video asset in state 150. This is in contrast to known approaches that launch any full-screen video from the same fixed position on the display, typically at the center of the display. Embodiments of the present disclosure are configured to maintain a sense of place in the browsing experience by launching the full-screen version of the video asset from the active browsing position, as illustrated in state 140, which shows the launching beginning from the active browsing position, as opposed to a standard position, such as the center of the screen.

In an embodiment, launching the full-screen version of the video asset comprises a zoom transition originating from the active browsing position, such that the display appears to expand out from the active browsing position to the full screen video. In an embodiment, the zoom transition resizes the video asset in the dwell video mode to fill the screen on the display. The system may play the video asset in a different format or aspect ratio than originally provided while ensuring display of a desired portion of the video. In an embodiment, the system is configured to dynamically detect the active browsing position based on a detected current location of the expanded visual tile on the display, and to load the full screen video centered on the expanded visual tile.

Figure 3:
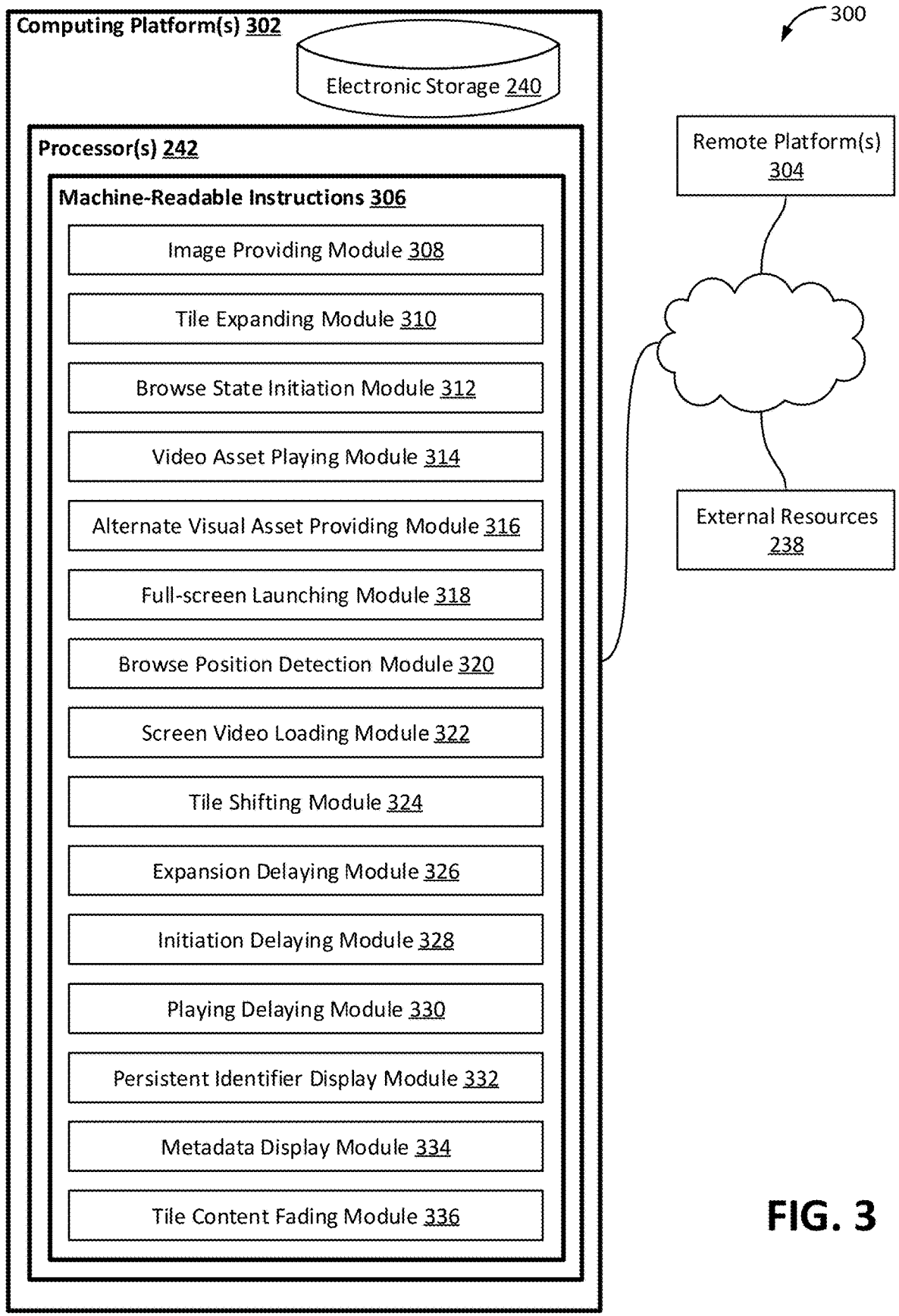
FIG. 3 illustrates a system configured for dynamic presentation of graphical and video content, in accordance with one or more embodiments.

FIG. 3 illustrates a system 300 configured for dynamic presentation of graphical and video content, in accordance with one or more embodiments. In some embodiments, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304.

Computing platform(s) 302 may be configured by machine-readable instructions 306. Machine-readable instructions 306 may include one or more instruction modules. The instruction modules may include computer program modules. The instruction modules may include one or more of image providing module 308, tile expanding module 310, browse state initiation module 312, video asset playing module 314, alternate visual asset providing module 316, full-screen launching module 318, browse position detection module 320, screen video loading module 322, tile shifting module 324, expansion delaying module 326, initiation delaying module 328, playing delaying module 330, persistent identifier display module 332, metadata display module 334, tile content fading module 336, and/or other instruction modules.

Image providing module 308 may be configured to provide, at a display associated with a playback device and in a static browsing state, a static image associated with underlying video content. The static image may be provided within an active visual tile, such as vertical visual tile. The vertical visual tile may have an aspect ratio of 2×3 and the widescreen aspect ratio is 16×9. The active visual tile may comprise a wider tile having an aspect ratio similar to the widescreen aspect ratio.

Tile expanding module 310 may be configured to, in response to an extended focus on the static image for a first threshold amount of time, expand the visual tile to a widescreen aspect ratio while remaining in the static browsing state.

Browse state initiation module 312 may be configured to, after a second threshold amount of time, initiate a dwell browsing state for the expanded visual tile in which dwell tile content is provided in the expanded visual tile, while other content on the display remains in the static browsing state.

Video asset playing module 314 may be configured to, in response to a determination that the playback device supports a dwell video mode, play a video asset within the expanded visual tile. The video asset may be provided in the dwell may browse state in the same aspect ratio as the wider tile. The video asset may be associated with the underlying video content. Video asset playing module 314 may be configured to play the video asset in a different format or aspect ratio than originally provided while ensuring display of a desired portion of the video.

Alternate visual asset providing module 316 may be configured to, in response to a determination that the playback device does not support the dwell video mode, provide an alternate non-video visual asset within the expanded visual tile. By way of non-limiting example, the determination of whether the playback device may support the dwell video mode is be based on one or more of device capabilities, internet connection speed available at the device, and type of device.

Full-screen launching module 318 may be configured to, in response to selection of the playing video asset in the expanded visual tile, launch a full-screen version of the video asset. The launching may start from an active browsing position of the expanded visual tile. Launching the full-screen version of the video asset may include a zoom transition originating from the active browsing position, such that the display appears to expand out from the active browsing position to the full screen video. The zoom transition may resize the video asset in the dwell video mode to fill the screen on the display.

Browse position detection module 320 may be configured to dynamically detect the active browsing position based on a detected current location of the expanded visual tile on the display.

Screen video loading module 322 may be configured to load the full screen video centered on the expanded visual tile.

Tile shifting module 324 may be configured to, when the visual tile is expanded to display the dwell tile content, shift adjacent tiles such that the shifted adjacent tiles are unobscured by the expanded visual tile.

Expansion delaying module 326 may be configured to delay expansion of the visual tile for displaying dwell tile content beyond the first threshold amount of time, for example based on detection of a display-limiting factor, such as a slow internet connection.

Initiation delaying module 328 may be configured to delay initiation of the dwell browsing state beyond the second threshold amount of time, for example based on detection of a display-limiting factor, such as slow internet connection, or difficulty accessing the video asset.

Playing delaying module 330 may be configured to delay playing of the video asset in the expanded tile in the dwell browsing state until a later time after the second threshold amount of time has been completed.

Persistent identifier display module 332 may be configured to persistently display a visual identifier in a layer on top of the static image in the static browsing state, and in the same position on top of the dwell tile content in the dwell browsing state.

Metadata display module 334 may be configured to display metadata associated with the dwell tile content while playing dwell tile content. The dwell tile content may play in a currently active tile while the other content on the display remains unchanged in the static browsing state.

Tile content fading module 336 may be configured to fade the dwell tile content in or out before or after playing the dwell tile content.

In some embodiments, computing platform(s) 302, remote platform(s) 304, and/or external resources 338 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 338 may be operatively linked via some other communication media.

A given remote platform 304 may include one or more processors configured to execute computer program modules. The computer program modules may be configured to enable an expert or user associated with the given remote platform 304 to interface with system 300 and/or external resources 338, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 338 may include sources of information outside of system 300, external entities participating with system 300, and/or other resources. In some embodiments, some or all of the functionality attributed herein to external resources 338 may be provided by resources included in system 300.

Computing platform(s) 302 may include electronic storage 340, one or more processors 342, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 340 may comprise non-transitory storage media that electronically stores information. The electronic storage media of electronic storage 340 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 340 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 340 may include one or more virtual storage resources (e.g., cloud storage, a virtual private network, and/or other virtual storage resources). Electronic storage 340 may store software algorithms, information determined by processor(s) 342, information received from computing platform(s) 302, information received from remote platform(s) 304, and/or other information that enables computing platform(s) 302 to function as described herein.

Processor(s) 342 may be configured to provide information processing capabilities in computing platform(s) 302. As such, processor(s) 342 may include one or more of a digital processor, an analog processor, a digital circuit designed to process information, an analog circuit designed to process information, a state machine, and/or other mechanisms for electronically processing information. Although processor(s) 342 is shown in FIG. 3 as a single entity, this is for illustrative purposes only. In some embodiments, processor(s) 342 may include a plurality of processing units. These processing units may be physically located within the same device, or processor(s) 342 may represent processing functionality of a plurality of devices operating in coordination. Processor(s) 342 may be configured to execute modules 308, 310, 312, 314, 316, 318, 320, 322, 324, 326, 328, 330, 332, 334, and/or 336, and/or other modules. Processor(s) 342 may be configured to execute modules 308, 310, 312, 314, 316, 318, 320, 322, 324, 326, 328, 330, 332, 334, and/or 336, and/or other modules by software; hardware; firmware; some combination of software, hardware, and/or firmware; and/or other mechanisms for configuring processing capabilities on processor(s) 342. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, 322, 324, 326, 328, 330, 332, 334, and/or 336 are illustrated in FIG. 3 as being implemented within a single processing unit, in embodiments in which processor(s) 342 includes multiple processing units, one or more of modules 308, 310, 312, 314, 316, 318, 320, 322, 324, 326, 328, 330, 332, 334, and/or 336 may be implemented remotely from the other modules. The description of the functionality provided by the different modules 308, 310, 312, 314, 316, 318, 320, 322, 324, 326, 328, 330, 332, 334, and/or 336 described below is for illustrative purposes, and is not intended to be limiting, as any of modules 308, 310, 312, 314, 316, 318, 320, 322, 324, 326, 328, 330, 332, 334, and/or 336 may provide more or less functionality than is described. For example, one or more of modules 308, 310, 312, 314, 316, 318, 320, 322, 324, 326, 328, 330, 332, 334, and/or 336 may be eliminated, and some or all of its functionality may be provided by other ones of modules 308, 310, 312, 314, 316, 318, 320, 322, 324, 326, 328, 330, 332, 334, and/or 336. As another example, processor(s) 342 may be configured to execute one or more additional modules that may perform some or all of the functionality attributed below to one of modules 308, 310, 312, 314, 316, 318, 320, 322, 324, 326, 328, 330, 332, 334, and/or 336.

Figure 4:
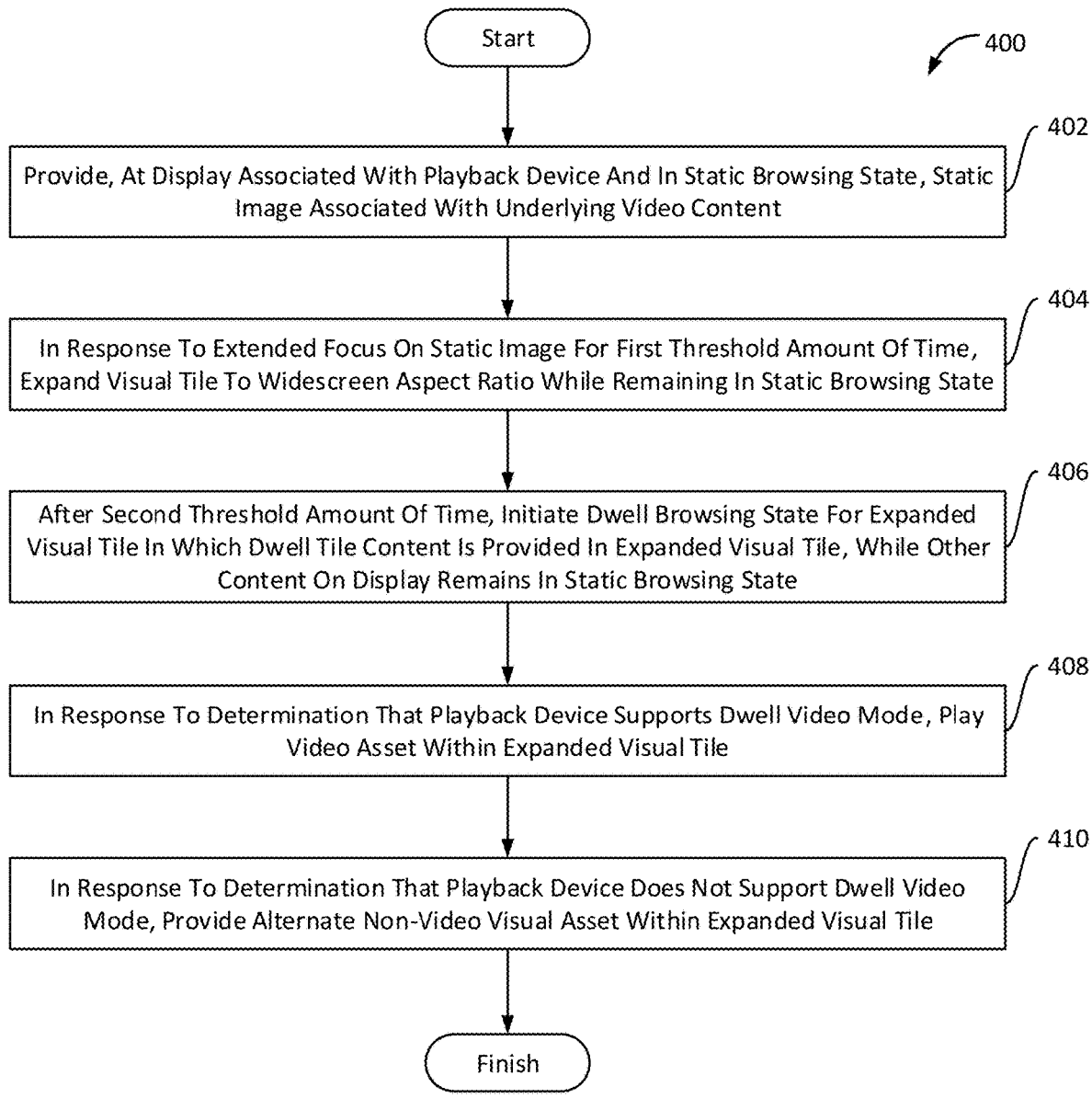
FIG. 4 illustrates a method for dynamic presentation of graphical and video content, in accordance with one or more embodiments.

FIG. 4 illustrates a method 400 for dynamic presentation of graphical and video content, in accordance with one or more embodiments. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include providing, at a display associated with a playback device and in a static browsing state, a static image associated with underlying video content. The static image may be provided within an active visual tile, such as vertical visual tile. Operation 402 may be performed by one or more hardware processors configured by machine-readable instructions including a module that is the same as or similar to image providing module 308, in accordance with one or more embodiments.

An operation 404 may include in response to an extended focus on the static image for a first threshold amount of time, expanding the visual tile to a widescreen aspect ratio while remaining in the static browsing state. Operation 404 may be performed by one or more hardware processors configured by machine-readable instructions including a module that is the same as or similar to tile expanding module 310, in accordance with one or more embodiments.

An operation 406 may include after a second threshold amount of time, initiating a dwell browsing state for the expanded visual tile in which dwell tile content is provided in the expanded visual tile, while other content on the display remains in the static browsing state.

Operation 406 may be performed by one or more hardware processors configured by machine-readable instructions including a module that is the same as or similar to browse state initiation module 312, in accordance with one or more embodiments.

An operation 408 may include in response to a determination that the playback device supports a dwell video mode, playing a video asset within the expanded visual tile. The video asset associated with the may underlie video content. Operation 408 may be performed by one or more hardware processors configured by machine-readable instructions including a module that is the same as or similar to video asset playing module 314, in accordance with one or more embodiments.

An operation 410 may include in response to a determination that the playback device does not support the dwell video mode, providing an alternate non-video visual asset within the expanded visual tile. Operation 410 may be performed by one or more hardware processors configured by machine-readable instructions including a module that is the same as or similar to alternate visual asset providing module 316, in accordance with one or more embodiments.

Embodiments of the present disclosure provide dynamic presentation of graphical and video content, for example within an app associated with a video streaming service. In an example implementation, dwell tiles may showcase in-line short video previews, where the playback device supports such video previews. This may be described as a graceful degradation based on platform capabilities, from a single source of truth. According to one or more embodiments, only one type of content curation is required, and the system is configured to determine what content should be displayed where and when, to send it to the correct place, which provides technical advantages over known approaches which have multiple content curation streams and associated technical drawbacks.

After user focus lingers on a title for a given amount of time, the tile may expand to display updated static content, intentionally without playing video content. The system does not start dwell tile content automatically, but waits for a threshold amount of time and provides the option of which type of dwell tile content to display based on device capabilities. If a user clicks into a tile during playback, the in-line short preview may continue to play as the tile expands to fill the screen, acting as a video motion background for an asset detail page, starting to launch from a current browsing position. Embodiments of the present disclosure empower users to quickly and easily discover and sample new content, without leaving a browsing state, and without unduly obscuring other elements of the browsing experience.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following clauses, with specific features laid out in the dependent clauses:

One aspect of the present disclosure relates to a system configured for dynamic presentation of graphical and video content. The system may include one or more hardware processors configured by machine-readable instructions. The processor(s) may be configured to provide, at a display associated with a playback device and in a static browsing state, a static image associated with underlying video content. The static image may be provided within an active visual tile, such as a vertical visual tile. The processor(s) may be configured to, in response to an extended focus on the static image for a first threshold amount of time, expand the visual tile to a widescreen aspect ratio while remaining in the static browsing state. The processor(s) may be configured to, after a second threshold amount of time, initiate a dwell browsing state for the expanded visual tile in which dwell tile content is provided in the expanded visual tile, while other content on the display remains in the static browsing state. The processor(s) may be configured to, in response to a determination that the playback device supports a dwell video mode, play a video asset within the expanded visual tile. The video asset associated with the may underlie video content. The processor(s) may be configured to, in response to a determination that the playback device does not support the dwell video mode, provide an alternate non-video visual asset within the expanded visual tile.

In some implementations of the system, the processor(s) may be configured to, in response to selection of the playing video asset in the expanded visual tile, launch a full-screen version of the video asset. In some implementations of the system, the launching may start from an active browsing position of the expanded visual tile.

In some implementations of the system, launching the full-screen version of the video asset may include a zoom transition originating from the active browsing position, such that the display appears to expand out from the active browsing position to the full screen video.

In some implementations of the system, the zoom transition may resize the video asset in the dwell video mode to fill the screen on the display.

In some implementations of the system, the processor(s) may be configured to dynamically detect the active browsing position based on a detected current location of the expanded visual tile on the display. In some implementations of the system, the processor(s) may be configured to load the full screen video centered on the expanded visual tile.

In some implementations of the system, the determination of whether the playback device may support the dwell video mode is be based on one or more of device capabilities, internet connection speed available at the device, and type of device.

In some implementations of the system, the processor(s) may be configured to, when the visual tile is expanded to display the dwell tile content, shift adjacent tiles such that the shifted adjacent tiles are unobscured by the expanded visual tile.

In some implementations of the system, the processor(s) may be configured to delay expansion of the visual tile for displaying dwell tile content beyond the first threshold amount of time based on detection of a display-limiting factor, such as a slow internet connection.

In some implementations of the system, the processor(s) may be configured to delay initiation of the dwell browsing state beyond the second threshold amount of time based on detection of a display-limiting factor, such as slow internet connection, or difficulty accessing the video asset.

In some implementations of the system, the processor(s) may be configured to delay playing of the video asset in the expanded tile in the dwell browsing state until a later time after the second threshold amount of time has been completed.

In some implementations of the system, the processor(s) may be configured to play the video asset in a different format or aspect ratio than originally provided while ensuring display of a desired portion of the video.

In some implementations of the system, the vertical visual tile may have an aspect ratio of 2×3 and the widescreen aspect ratio is 16×9.

In some implementations of the system, the vertical visual tile may include a wider tile having an aspect ratio similar to the widescreen aspect ratio. In some implementations of the system, the video asset is provided in the dwell may browse state in the same aspect ratio as the wider tile.

In some implementations of the system, the first and second threshold amounts of time may be adjustable based on detected device capabilities or user-specific settings.

In some implementations of the system, the processor(s) may be configured to persistently display a visual identifier in a layer on top of the static image in the static browsing state, and in the same position on top of the dwell tile content in the dwell browsing state.

In some implementations of the system, the dwell tile content may play in a currently active tile while the other content on the display remains unchanged in the static browsing state.

In some implementations of the system, the processor(s) may be configured to display metadata associated with the dwell tile content while playing dwell tile content.

In some implementations of the system, the processor(s) may be configured to fade the dwell tile content in or out before or after playing the dwell tile content.

Another aspect of the present disclosure relates to a method for dynamic presentation of graphical and video content. The method may include providing, at a display associated with a playback device and in a static browsing state, a static image associated with underlying video content. The static image may be provided within an active visual tile, such as vertical visual tile. The method may include, in response to an extended focus on the static image for a first threshold amount of time, expanding the visual tile to a widescreen aspect ratio while remaining in the static browsing state. The method may include, after a second threshold amount of time, initiating a dwell browsing state for the expanded visual tile in which dwell tile content is provided in the expanded visual tile, while other content on the display remains in the static browsing state. The method may include, in response to a determination that the playback device supports a dwell video mode, playing a video asset within the expanded visual tile. The video asset associated with the may underlie video content. The method may include, in response to a determination that the playback device does not support the dwell video mode, providing an alternate non-video visual asset within the expanded visual tile.

In some implementations of the method, it may include, in response to selection of the playing video asset in the expanded visual tile, launching a full-screen version of the video asset. In some implementations of the method, the launching may start from an active browsing position of the expanded visual tile.

In some implementations of the method, launching the full-screen version of the video asset may include a zoom transition originating from the active browsing position, such that the display appears to expand out from the active browsing position to the full screen video.

In some implementations of the method, the zoom transition may resize the video asset in the dwell video mode to fill the screen on the display.

In some implementations of the method, it may include dynamically detecting the active browsing position based on a detected current location of the expanded visual tile on the display. In some implementations of the method, it may include loading the full screen video centered on the expanded visual tile.

In some implementations of the method, the determination of whether the playback device may support the dwell video mode is be based on one or more of device capabilities, internet connection speed available at the device, and type of device.

In some implementations of the method, it may include, when the visual tile is expanded to display the dwell tile content, shifting adjacent tiles such that the shifted adjacent tiles are unobscured by the expanded visual tile.

In some implementations of the method, it may include delaying expansion of the visual tile for displaying dwell tile content beyond the first threshold amount of time based on detection of a display-limiting factor, such as a slow internet connection.

In some implementations of the method, it may include delaying initiation of the dwell browsing state beyond the second threshold amount of time based on detection of a display-limiting factor, such as slow internet connection, or difficulty accessing the video asset.

In some implementations of the method, it may include delaying playing of the video asset in the expanded tile in the dwell browsing state until a later time after the second threshold amount of time has been completed.

In some implementations of the method, it may include playing the video asset in a different format or aspect ratio than originally provided while ensuring display of a desired portion of the video.

In some implementations of the method, the vertical visual tile may have an aspect ratio of 2×3 and the widescreen aspect ratio is 16×9.

In some implementations of the method, the vertical visual tile may include a wider tile having an aspect ratio similar to the widescreen aspect ratio. In some implementations of the method, the video asset is provided in the dwell may browse state in the same aspect ratio as the wider tile.

In some implementations of the method, the first and second threshold amounts of time may be adjustable based on detected device capabilities or user-specific settings.

In some implementations of the method, it may include persistently displaying a visual identifier in a layer on top of the static image in the static browsing state, and in the same position on top of the dwell tile content in the dwell browsing state.

In some implementations of the method, the dwell tile content may play in a currently active tile while the other content on the display remains unchanged in the static browsing state.

In some implementations of the method, it may include displaying metadata associated with the dwell tile content while playing dwell tile content.

In some implementations of the method, it may include fading the dwell tile content in or out before or after playing the dwell tile content.

Yet another aspect of the present disclosure relates to a non-transient computer-readable storage medium having instructions embodied thereon, the instructions being executable by one or more processors to perform a method for dynamic presentation of graphical and video content. The method may include providing, at a display associated with a playback device and in a static browsing state, a static image associated with underlying video content. The static image may be provided within an active visual tile, such as vertical visual tile. The method may include, in response to an extended focus on the static image for a first threshold amount of time, expanding the visual tile to a widescreen aspect ratio while remaining in the static browsing state. The method may include, after a second threshold amount of time, initiating a dwell browsing state for the expanded visual tile in which dwell tile content is provided in the expanded visual tile, while other content on the display remains in the static browsing state. The method may include, in response to a determination that the playback device supports a dwell video mode, playing a video asset within the expanded visual tile. The video asset associated with the may underlie video content. The method may include, in response to a determination that the playback device does not support the dwell video mode, providing an alternate non-video visual asset within the expanded visual tile.

In some implementations of the computer-readable storage medium, the method may include, in response to selection of the playing video asset in the expanded visual tile, launching a full-screen version of the video asset. In some implementations of the computer-readable storage medium, the launching may start from an active browsing position of the expanded visual tile.

In some implementations of the computer-readable storage medium, launching the full-screen version of the video asset may include a zoom transition originating from the active browsing position, such that the display appears to expand out from the active browsing position to the full screen video.

In some implementations of the computer-readable storage medium, the zoom transition may resize the video asset in the dwell video mode to fill the screen on the display.

In some implementations of the computer-readable storage medium, the method may include dynamically detecting the active browsing position based on a detected current location of the expanded visual tile on the display. In some implementations of the computer-readable storage medium, the method may include loading the full screen video centered on the expanded visual tile.

In some implementations of the computer-readable storage medium, the determination of whether the playback device may support the dwell video mode is be based on one or more of device capabilities, internet connection speed available at the device, and type of device.

In some implementations of the computer-readable storage medium, the method may include, when the visual tile is expanded to display the dwell tile content, shifting adjacent tiles such that the shifted adjacent tiles are unobscured by the expanded visual tile.

In some implementations of the computer-readable storage medium, the method may include delaying expansion of the visual tile for displaying dwell tile content beyond the first threshold amount of time based on detection of a display-limiting factor, such as a slow internet connection.

In some implementations of the computer-readable storage medium, the method may include delaying initiation of the dwell browsing state beyond the second threshold amount of time based on detection of a display-limiting factor, such as slow internet connection, or difficulty accessing the video asset.

In some implementations of the computer-readable storage medium, the method may include delaying playing of the video asset in the expanded tile in the dwell browsing state until a later time after the second threshold amount of time has been completed.

In some implementations of the computer-readable storage medium, the method may include playing the video asset in a different format or aspect ratio than originally provided while ensuring display of a desired portion of the video.

In some implementations of the computer-readable storage medium, the vertical visual tile may have an aspect ratio of 2×3 and the widescreen aspect ratio is 16×9.

In some implementations of the computer-readable storage medium, the vertical visual tile may include a wider tile having an aspect ratio similar to the widescreen aspect ratio. In some implementations of the computer-readable storage medium, the video asset is provided in the dwell may browse state in the same aspect ratio as the wider tile.

In some implementations of the computer-readable storage medium, the first and second threshold amounts of time may be adjustable based on detected device capabilities or user-specific settings.

In some implementations of the computer-readable storage medium, the method may include persistently displaying a visual identifier in a layer on top of the static image in the static browsing state, and in the same position on top of the dwell tile content in the dwell browsing state.

In some implementations of the computer-readable storage medium, the dwell tile content may play in a currently active tile while the other content on the display remains unchanged in the static browsing state.

In some implementations of the computer-readable storage medium, the method may include displaying metadata associated with the dwell tile content while playing dwell tile content.

In some implementations of the computer-readable storage medium, the method may include fading the dwell tile content in or out before or after playing the dwell tile content.

Still another aspect of the present disclosure relates to a system configured for dynamic presentation of graphical and video content. The system may include means for providing, at a display associated with a playback device and in a static browsing state, a static image associated with underlying video content. The static image may be provided within an active visual tile, such as vertical visual tile. The system may include means for, in response to an extended focus on the static image for a first threshold amount of time, expanding the visual tile to a widescreen aspect ratio while remaining in the static browsing state. The system may include means for, after a second threshold amount of time, initiating a dwell browsing state for the expanded visual tile in which dwell tile content is provided in the expanded visual tile, while other content on the display remains in the static browsing state. The system may include means for, in response to a determination that the playback device supports a dwell video mode, playing a video asset within the expanded visual tile. The video asset associated with the may underlie video content. The system may include means for, in response to a determination that the playback device does not support the dwell video mode, providing an alternate non-video visual asset within the expanded visual tile.

In some implementations of the system, the system may include means for, in response to selection of the playing video asset in the expanded visual tile, launching a full-screen version of the video asset. In some implementations of the system, the launching may start from an active browsing position of the expanded visual tile.

In some implementations of the system, launching the full-screen version of the video asset may include a zoom transition originating from the active browsing position, such that the display appears to expand out from the active browsing position to the full screen video.

In some implementations of the system, the zoom transition may resize the video asset in the dwell video mode to fill the screen on the display.

In some implementations of the system, the system may include means for dynamically detecting the active browsing position based on a detected current location of the expanded visual tile on the display. In some implementations of the system, the system may include means for loading the full screen video centered on the expanded visual tile.

In some implementations of the system, the determination of whether the playback device may support the dwell video mode is be based on one or more of device capabilities, internet connection speed available at the device, and type of device.

In some implementations of the system, the system may include means for, when the visual tile is expanded to display the dwell tile content, shifting adjacent tiles such that the shifted adjacent tiles are unobscured by the expanded visual tile.

In some implementations of the system, the system may include means for delaying expansion of the visual tile for displaying dwell tile content beyond the first threshold amount of time based on detection of a display-limiting factor, such as a slow internet connection.

In some implementations of the system, the system may include means for delaying initiation of the dwell browsing state beyond the second threshold amount of time based on detection of a display-limiting factor, such as slow internet connection, or difficulty accessing the video asset.

In some implementations of the system, the system may include means for delaying playing of the video asset in the expanded tile in the dwell browsing state until a later time after the second threshold amount of time has been completed.

In some implementations of the system, the system may include means for playing the video asset in a different format or aspect ratio than originally provided while ensuring display of a desired portion of the video.

In some implementations of the system, the vertical visual tile may have an aspect ratio of 2×3 and the widescreen aspect ratio is 16×9.

In some implementations of the system, the vertical visual tile may include a wider tile having an aspect ratio similar to the widescreen aspect ratio. In some implementations of the system, the video asset is provided in the dwell may browse state in the same aspect ratio as the wider tile.

In some implementations of the system, the first and second threshold amounts of time may be adjustable based on detected device capabilities or user-specific settings.

In some implementations of the system, the system may include means for persistently displaying a visual identifier in a layer on top of the static image in the static browsing state, and in the same position on top of the dwell tile content in the dwell browsing state.

In some implementations of the system, the dwell tile content may play in a currently active tile while the other content on the display remains unchanged in the static browsing state.

In some implementations of the system, the system may include means for displaying metadata associated with the dwell tile content while playing dwell tile content.

In some implementations of the system, the system may include means for fading the dwell tile content in or out before or after playing the dwell tile content.

Even another aspect of the present disclosure relates to a computing platform configured for dynamic presentation of graphical and video content. The computing platform may include a non-transient computer-readable storage medium having executable instructions embodied thereon. The computing platform may include one or more hardware processors configured to execute the instructions. The processor(s) may execute the instructions to provide, at a display associated with a playback device and in a static browsing state, a static image associated with underlying video content. The static image may be provided within an active visual tile, such as vertical visual tile. The processor(s) may execute the instructions to, in response to an extended focus on the static image for a first threshold amount of time, expand the visual tile to a widescreen aspect ratio while remaining in the static browsing state. The processor(s) may execute the instructions to, after a second threshold amount of time, initiate a dwell browsing state for the expanded visual tile in which dwell tile content is provided in the expanded visual tile, while other content on the display remains in the static browsing state. The processor(s) may execute the instructions to, in response to a determination that the playback device supports a dwell video mode, play a video asset within the expanded visual tile. The video asset associated with the may underlie video content. The processor(s) may execute the instructions to, in response to a determination that the playback device does not support the dwell video mode, provide an alternate non-video visual asset within the expanded visual tile.

In some implementations of the computing platform, the processor(s) may execute the instructions to, in response to selection of the playing video asset in the expanded visual tile, launch a full-screen version of the video asset. In some implementations of the computing platform, the launching may start from an active browsing position of the expanded visual tile.

In some implementations of the computing platform, launching the full-screen version of the video asset may include a zoom transition originating from the active browsing position, such that the display appears to expand out from the active browsing position to the full screen video.

In some implementations of the computing platform, the zoom transition may resize the video asset in the dwell video mode to fill the screen on the display.

In some implementations of the computing platform, the processor(s) may execute the instructions to dynamically detect the active browsing position based on a detected current location of the expanded visual tile on the display. In some implementations of the computing platform, the processor(s) may execute the instructions to load the full screen video centered on the expanded visual tile.

In some implementations of the computing platform, the determination of whether the playback device may support the dwell video mode is be based on one or more of device capabilities, internet connection speed available at the device, and type of device.

In some implementations of the computing platform, the processor(s) may execute the instructions to, when the visual tile is expanded to display the dwell tile content, shift adjacent tiles such that the shifted adjacent tiles are unobscured by the expanded visual tile.

In some implementations of the computing platform, the processor(s) may execute the instructions to delay expansion of the visual tile for displaying dwell tile content beyond the first threshold amount of time based on detection of a display-limiting factor, such as a slow internet connection.

In some implementations of the computing platform, the processor(s) may execute the instructions to delay initiation of the dwell browsing state beyond the second threshold amount of time based on detection of a display-limiting factor, such as slow internet connection, or difficulty accessing the video asset.

In some implementations of the computing platform, the processor(s) may execute the instructions to delay playing of the video asset in the expanded tile in the dwell browsing state until a later time after the second threshold amount of time has been completed.

In some implementations of the computing platform, the processor(s) may execute the instructions to play the video asset in a different format or aspect ratio than originally provided while ensuring display of a desired portion of the video.

In some implementations of the computing platform, the vertical visual tile may have an aspect ratio of 2×3 and the widescreen aspect ratio is 16×9.

In some implementations of the computing platform, the vertical visual tile may include a wider tile having an aspect ratio similar to the widescreen aspect ratio. In some implementations of the computing platform, the video asset is provided in the dwell may browse state in the same aspect ratio as the wider tile.

In some implementations of the computing platform, the first and second threshold amounts of time may be adjustable based on detected device capabilities or user-specific settings.

In some implementations of the computing platform, the processor(s) may execute the instructions to persistently display a visual identifier in a layer on top of the static image in the static browsing state, and in the same position on top of the dwell tile content in the dwell browsing state.

In some implementations of the computing platform, the dwell tile content may play in a currently active tile while the other content on the display remains unchanged in the static browsing state.

In some implementations of the computing platform, the processor(s) may execute the instructions to display metadata associated with the dwell tile content while playing dwell tile content.

In some implementations of the computing platform, the processor(s) may execute the instructions to fade the dwell tile content in or out before or after playing the dwell tile content.

What is claimed is:

1. A computing platform configured for dynamic presentation of graphical and video content, the computing platform comprising:
   a non-transient computer-readable storage medium having executable instructions embodied thereon; and
   one or more hardware processors configured to execute the instructions to:
      provide, at a display associated with a playback device and in a static browsing state, a static image associated with underlying video content, the static image being provided within a vertical visual tile;
      in response to an extended focus on the static image for a first threshold amount of time, expand the visual tile to a widescreen aspect ratio while remaining in the static browsing state;
      after a second threshold amount of time, initiate a dwell browsing state for the expanded visual tile in which dwell tile content is provided in the expanded visual tile, while other content on the display remains in the static browsing state;
      in response to a determination that the playback device supports a dwell video mode, play a video asset within the expanded visual tile, the video asset associated with the underlying video content; and
      in response to a determination that the playback device does not support the dwell video mode, provide an alternate non-video visual asset within the expanded visual tile.

2. The computing platform of claim 1, wherein the one or more hardware processors are further configured by the instructions to:
   in response to selection of the playing video asset in the expanded visual tile, launch a full-screen version of the video asset, wherein the launching starts from an active browsing position of the expanded visual tile.

3. The computing platform of claim 2, wherein the one or more hardware processors are further configured by the instructions to:
   dynamically detect the active browsing position based on a detected current location of the expanded visual tile on the display; and
   load the full screen video centered on the expanded visual tile.

4. The computing platform of claim 1, wherein the determination of whether the playback device supports the dwell video mode is be based on one or more of device capabilities, internet connection speed available at the device, and type of device.

5. The computing platform of claim 1, wherein the one or more hardware processors are further configured by the instructions to:
when the visual tile is expanded to display the dwell tile content, shift adjacent tiles such that the shifted adjacent tiles are unobscured by the expanded visual tile.

6. The computing platform of claim 1, wherein the one or more hardware processors are further configured by the instructions to:
persistently display a visual identifier in a layer on top of the static image in the static browsing state, and in the same layer on top of the dwell tile content in the dwell browsing state.

7. The computing platform of claim 1, wherein the dwell tile content plays in a currently active tile while other content on the display remains unchanged in the static browsing state.

8. The computing platform of claim 2, wherein launching the full-screen version of the video asset comprises a zoom transition originating from the active browsing position, such that the display appears to expand out from the active browsing position to the full screen video.

9. The computing platform of claim 8, wherein the zoom transition resizes the video asset in the dwell video mode to fill the screen on the display.

10. A processor-implemented method of dynamic presentation of graphical and video content, the method comprising:
providing, at a display associated with a playback device and in a static browsing state, a static image associated with underlying video content, the static image being provided within a vertical visual tile;
in response to an extended focus on the static image for a first threshold amount of time, expanding the visual tile to a widescreen aspect ratio while remaining in the static browsing state; and
after a second threshold amount of time, initiating a dwell browsing state for the expanded visual tile in which dwell tile content is provided in the expanded visual tile, while other content on the display remains in the static browsing state; and
in response to a determination that the playback device supports a dwell video mode, playing a video asset within the expanded visual tile, the video asset associated with the underlying video content; and
in response to a determination that the playback device does not support the dwell video mode, providing an alternate non-video visual asset within the expanded visual tile.

11. The method of claim 10, further comprising:
in response to selection of the playing video asset in the expanded visual tile, launching a full-screen version of the video asset, wherein the launching starts from an active browsing position of the expanded visual tile.

12. The method of claim 11, further comprising:
dynamically detecting the active browsing position based on a detected current location of the expanded visual tile on the display; and
loading the full screen video centered on the expanded visual tile.

13. The method of claim 10, wherein the determination of whether the playback device supports the dwell video mode is be based on one or more of device capabilities, internet connection speed available at the device, and type of device.

14. The method of claim 10, further comprising:
when the visual tile is expanded to display the dwell tile content, shifting adjacent tiles such that the shifted adjacent tiles are unobscured by the expanded visual tile.

15. The method of claim 10, further comprising:
persistently displaying a visual identifier in a layer on top of the static image in the static browsing state, and in the same position on top of the dwell tile content in the dwell browsing state.

16. The method of claim 10, wherein the dwell tile content plays in a currently active tile while the other content on the display remains unchanged in the static browsing state.

17. The method of claim 11, wherein launching the full-screen version of the video asset comprises a zoom transition originating from the active browsing position, such that the display appears to expand out from the active browsing position to the full screen video.

18. The method of claim 17, wherein the zoom transition resizes the video asset in the dwell video mode to fill the screen on the display.

19. A non-transient computer-readable storage medium having instructions embodied thereon, the instructions being executable by one or more processors to perform a method for dynamic presentation of graphical and video content, the method comprising:
providing, at a display associated with a playback device and in a static browsing state, a static image associated with underlying video content, the static image being provided within a vertical visual tile;
in response to an extended focus on the static image for a first threshold amount of time, expanding the visual tile to a widescreen aspect ratio while remaining in the static browsing state; and
after a second threshold amount of time, initiating a dwell browsing state for the expanded visual tile in which dwell tile content is provided in the expanded visual tile, while other content on the display remains in the static browsing state; and
in response to a determination that the playback device supports a dwell video mode, playing a video asset within the expanded visual tile, the video asset associated with the underlying video content; and
in response to a determination that the playback device does not support the dwell video mode, providing an alternate non-video visual asset within the expanded visual tile.

20. The computer-readable storage medium of claim 19, wherein the method further comprises:
in response to selection of the playing video asset in the expanded visual tile, launching a full-screen version of the video asset, wherein the launching starts from an active browsing position of the expanded visual tile.

* * * * *